June 26, 1951 — W. S. SELZER — 2,558,062
HOT DRINK MACHINE
Filed Feb. 11, 1946 — 2 Sheets-Sheet 1
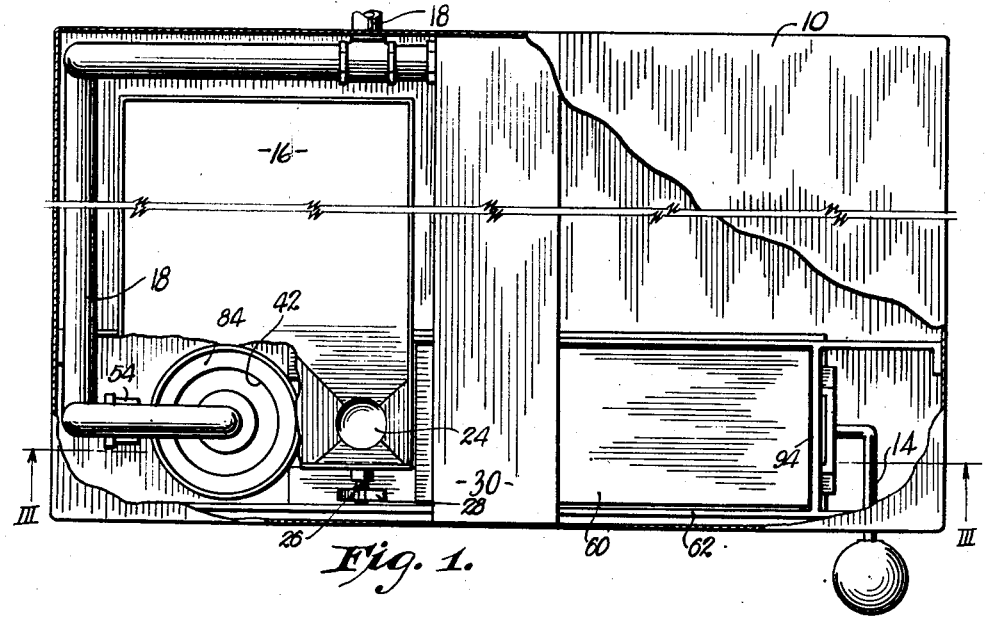
Fig. 1.
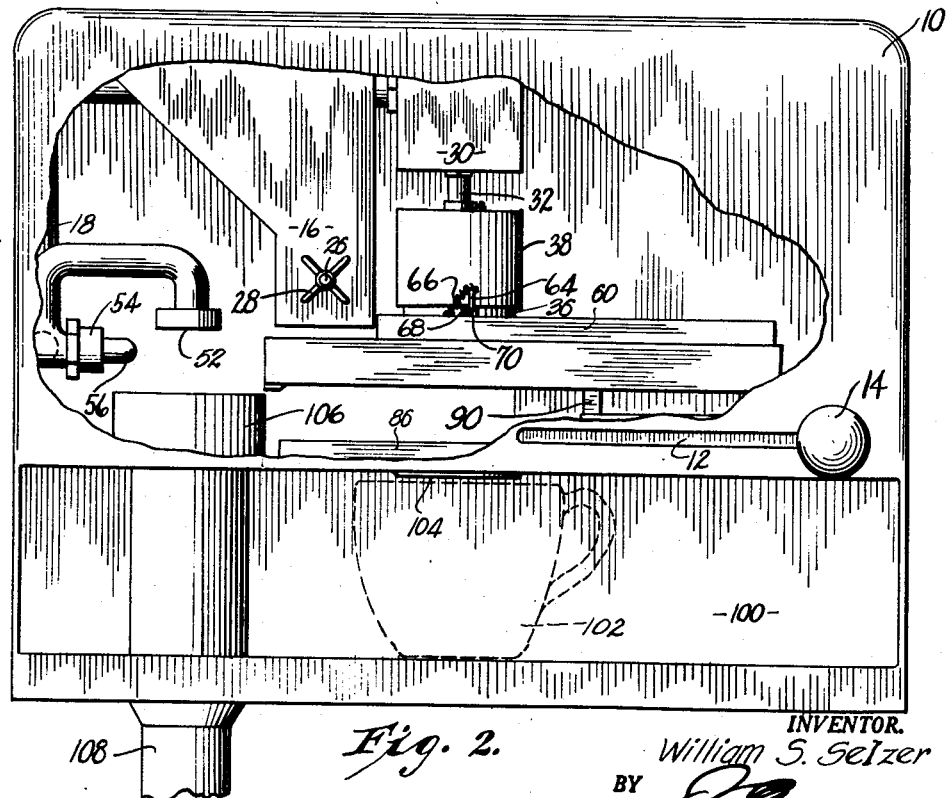
Fig. 2.
INVENTOR.
William S. Selzer
BY 
ATTORNEY.

June 26, 1951  W. S. SELZER  2,558,062
HOT DRINK MACHINE
Filed Feb. 11, 1946  2 Sheets-Sheet 2

INVENTOR.
William S. Selzer
BY
ATTORNEY.

Patented June 26, 1951

2,558,062

UNITED STATES PATENT OFFICE 2,558,062

HOT DRINK MACHINE

William S. Selzer, Warrensburg, Mo.

Application February 11, 1946, Serial No. 646,927

6 Claims. (Cl. 99—289)

This invention relates to material mixing devices in the nature of apparatus for preparing drinks having a number of ingredients, one of which is a liquid and the primary aim of my invention is to provide a machine for mixing hot drinks in the nature of coffee, tea or chocolate.

One of the important objects of my invention is to provide a simple, inexpensive, durable and efficient piece of equipment for quickly preparing a cup of coffee or other hot drink of similar character upon manual manipulation of a portion of the machine.

A further object of the invention is the provision of a hot drink machine having as a salient feature thereof shiftable structure for automatically utilizing a number of ingredients constituting a drink which is deposited in a cup when the said structure has been moved through a predetermined portion of its path of travel.

Further aims of the invention include the provision, in a machine of the aforementioned character, of reciprocable structure having a chamber for receiving coffee or the like in comminuted form and thereafter passing hot water through the chamber to complete the formation of a drink; the provision of means for cleaning the drink mixing cavity of the machine after each time a drink is prepared; the provision of unique parts for automatically flushing fluid through the said chamber and for dumping the used and spent contents thereof when the aforesaid reciprocable structure is at one end of its path of travel; and the provision of unique equipment for introducing hot water to and through the aforesaid chamber to a receiving cup when the said reciprocable structure is in a certain location with respect to its path of travel.

Further aims of the invention include the particular arrangement of parts, the unique manner in which the said parts cooperate to produce a simple and effective machine and the mode of operating the several units in the machine, all of which contribute to the production of a satisfactory drink.

The form of the hot drink machine chosen for illustration is shown in the accompanying drawings, wherein:

Fig. 1 is a top plan view of a hot drink machine made pursuant to the present invention with parts of the closing case broken away to reveal portions of the mechanism.

Fig. 2 is a side elevational view of the machine.

Figure 3:
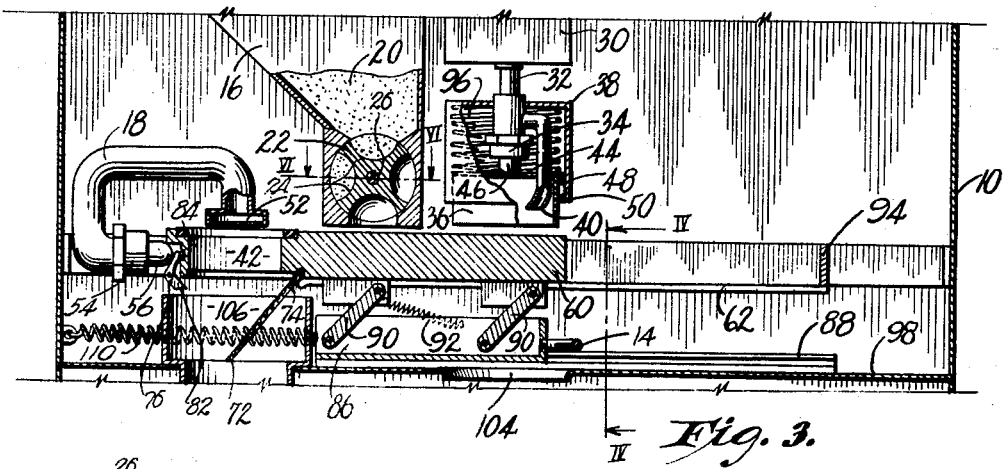
Fig. 3 is a fragmentary longitudinal sectional view through the machine taken substantially on line III—III of Fig. 1 but with the reciprocable structure at the opposite end of its path of travel from that shown in said Fig. 1.

It has long been desirable to produce a simple, inexpensive, yet efficient machine for commercially preparing a cup of hot coffee or similar drink which would be acceptable to the trade and that would not consume an undesirable length of time to prepare. Heretofore such machines have been complicated, involved and objectionable from the standpoint of becoming out of order and unsanitary. A hot drink producing device contemplated by my invention may be made with relatively little expense, serviced and installed with convenience and despatch and operated by the general public without danger of maladjustment or breakdown due to handling.

The machine illustrated in the accompanying drawings is a typical example of a portable, easily installed and profitable apparatus. It comprises an enclosing case 10, attractively formed and provided with suitable openings, one of which is in the nature of a slot 12 permitting manipulation of an operating handle 14, as will be more fully hereinafter described. A hopper 16 within case 10 may also be filled through a covered access hole in the top of case 10 and water for flushing and preparing the drink is supplied through a pipe 18 that enters case 10 through a perforation.

Figure 6:
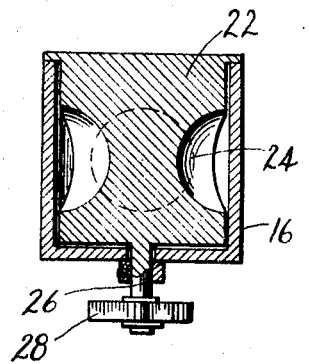
Fig. 6 is a fragmentary detailed sectional view taken on line VI—VI of Fig. 3 looking in the direction of the arrows and on an enlarged scale.

Hopper 16 is designed to carry one of the ingredients of the drink and for purpose of description it will be assumed that the machine is to be employed in the preparation of hot coffee. Ground and otherwise commercially satisfactory coffee 20 is, therefore, the ingredient in hopper 16. A feeding rotor 22 rotatably mounted in the bottom of hopper 16, as clearly illustrated in Figs. 3 and 6, has a number of cavities 24, each of which is capable of removing a predetermined amount of ingredient 20 from within hopper 16 and depositing that said ingredient into an underlying chamber later to be specified.

Rotor 22 has an axial shaft 26 extending outwardly from hopper 16 and a star wheel 28 mounted on shaft 26 lies in the path of travel of an operating element on the hereinafter described reciprocable structure. At this juncture it is sufficient to clarify that rotor 22 is moved in step-by-step fashion as the machine is operated.

Another ingredient constituting the drink is of course, a liquid and hot water is made available because of the employment of a reservoir 30 completely housed within case 10 and having connection with water supply pipe 18, as illustrated in Fig. 1. Any suitable heating means, not here shown, is contemplated and in fact the supply pipe 18 may lead from a source of hot water if found necessary or desirable. Water from reservoir 30 is fed therefrom through pipe 32. The passage of water through this pipe 32 is controlled by a valve 34 and a tubular section 36 mounted in housing 38 for raising and lowering during the operation of the machine. Nozzle 40 terminates within section 36 and from the lower end of this nozzle, the hot water pours into chamber 42 when the latter underlies section 36. A spider 44 at the top of section 36 engages the operating plunger 46 of valve 34 and since this valve is of the commercial type that is obtainable on the open market, the same need not be detailed.

Figure 4:
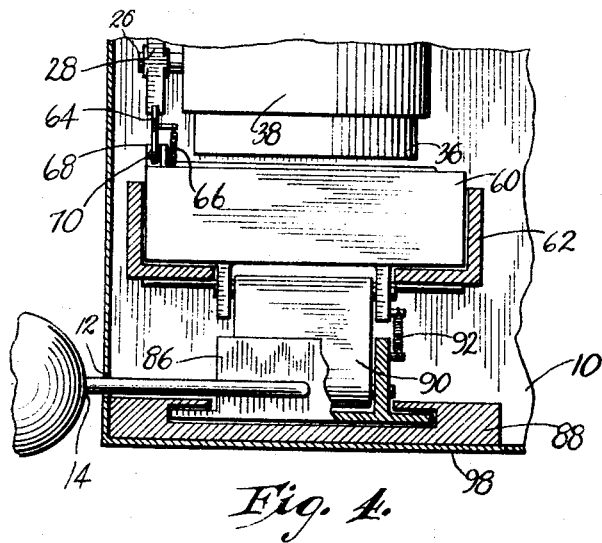
Fig. 4 is a fragmentary detailed vertical sectional view on an enlarged scale taken on line IV—IV of Fig. 3.

The valve 34 automatically allows a measured amount of hot water to pass through pipe 32 and nozzle 40 when plunger 46 has been depressed. An annular flange 48 on section 36 rests upon an inturned flange 50 of housing 38 when the parts just identified are in a normal position. Supply pipe 18 is extended to a nozzle 52 disposed as illustrated in Fig. 3. Valve 54 similar in all respects to valve 34 controls the passage of water from supply pipe 18 to nozzle 52 and its plunger 56 is contacted and depressed by a part of the reciprocable structure comprising a carriage section 86 and a chambered section 60 wherein the aforementioned chamber 42 is provided. This chambered section moves along slides 62 carried within case 10 and an operating finger 64 for star wheel 28 is carried by section 60 in a manner illustrated by Figs. 2 and 4.

This finger 64 has a spring 66 that yieldably maintains the finger 64 in the vertical condition illustrated. The finger is mounted adjacent to an abutment 68 allowing the finger to move about its axle 70 in one direction but preventing its movement from the vertical position in the opposite direction; thus, a jack-knife joint is established and when finger 64 passes below star wheel 28 in one direction, rotor 22 will remain stationary but when finger 64 strikes star wheel 28 when section 60 is moving in the opposite direction, rotor 22 will be moved one step.

Figure 5:
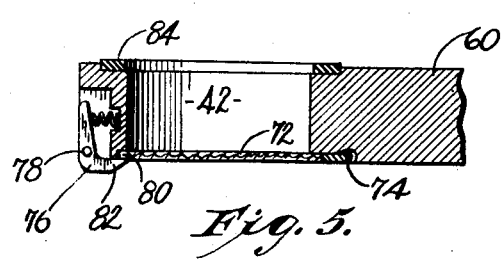
Fig. 5 is an enlarged detailed fragmentary sectional view through that portion of the reciprocable structure having the ingredient receiving chamber therein.

Chamber 42 is bottomed by a foraminous sheet of material 72 hinged as at 74 and releasably held in the operative position shown in Fig. 5 by a spring loaded latch 76 pivoted at 78. When latch 76 is moved to the position shown in Fig. 3, bottom 72 will drop through the action of gravity. Slides 62 terminate short of the end of section 60 to allow this dropping action to occur and as section 60 is moved along slides 62, the weight of any material within chamber 42 will be borne not only by latch 76 holding bottom 72 in place but by slides 62 as well. Bottom 72 is returned to the normal position shown in Fig. 5 by slides 62 when section 60 is shifted to the right as viewed in Fig. 3. When bottom 72 is snapped upwardly its inclined face 80 will engage inclined face 82 on latch 76 to automatically establish the relation illustrated.

A gasket or sealing ring 84 on section 60 around chamber 42 insures a perfect seal when section 60 is in a position to raise section 36 to open valve 34. This position is illustrated in Fig. 2.

Carriage section 86 rides in tracks 88 and it is to this carriage that operating handle 14 is attached. A pair of parallel links 90 supports chambered section 60 on carriage 86 and a spring 92 yieldably maintains section 60 in the lowered position where it rests upon slides 62. As carriage 86 reaches one end of its path of travel remote from that position shown in Fig. 3, section 60 will strike wall 94 to prevent further longitudinal movement. As carriage 86 continues to travel along tracks 88 however, links 90 will be forced toward a substantially vertical position and chambered section 60 will be lifted vertically where gasket 84 will come into direct engagement with the lower annular edge of section 36 to lift the same within housing 38 against the force of a spring 96. Such lifting will force spider 44 against plunger 46 and actuate valve 34 to feed a given amount of hot water from reservoir 30 through nozzle 40 and directly into chamber 42 where a measured quantity of coffee or similar ingredient 20 has been dumped as a result of chamber 42 having passed below rotor 22. As chambered section 60 moves rectilinearly along slides 62, finger 64 will strike star wheel 28 and move the same one step to advance one of the measuring cavities 24 to a place where the ingredient 20 therein will be dumped into chamber 42. A partition 98 within case 10 cooperates with the remaining part of said case to present a compartment 100 wherein a suitable container 102 is placed below an opening 104 in partition 98 and when water is forced through nozzle 40, chamber 42 overlies opening 104.

When chambered section 60 is at one end of its path of travel (shown in Fig. 3) chamber 42 underlies nozzle 52 and plunger 56 of valve 54 is resting against latch 76 not only to release bottom 72 but to depress plunger 56 to a point where valve 54 will allow a charge of water to pass through nozzle 52 and flush chamber 42 and bottom 72. During this flushing operation, bottom 72 is dropped into the upper portion of a waste receiver 106 connected to a drain or other suitable means of disposal by a pipe 108.

The cycle of operation and manner of producing a drink has been very clearly revealed during the course of the above specification and it will be apparent that the machine and parts thereof are in the condition shown in Fig. 3 when the customer or operator first approaches the same for the purpose of obtaining a hot drink therefrom. A retrieving spring 110 connected to one end of carriage 86 insures the return of the entire reciprocable structure comprising chambered section 60 and carriage 86 after a drink has been produced. When handle 14 is moved along slot 12, the reciprocable section will be shifted longitudinally until a charge of ingredient 20 is emptied into chamber 42. Just prior to the introduction of this said charge, bottom 72 will be snapped to a closed position by slides 62. Continued movement of the reciprocable structure toward wall 94 will shift section 60 upwardly to release a charge of hot water into chamber 42 through the charge of ingredient therein for making the drink and thence into container 102. A perfect seal between section 36 and section 60 is established by gasket 84. After container 102 has received the prepared drink, handle 14 is released and spring 110 moves the entire reciprocable structure toward valve 54 where bottom 72 is dropped and a quantity of water is forced through chamber 42 and against bottom 72 to cleanse these parts. Obviously, as the handle is released and as chamber 60 moves to the left as viewed in Fig. 3, spring 92 will lower section 60 to a place against slides 62. Manifestly handle 14 may be held against movement until a coin or other token is dropped into the machine if it is desired to provide such an expedient therein.

The machine shown and described is particularly adapted for counter use where coffee is to be made fresh cup by cup, the same as is now the practice in mixing soft iced drinks.

It is understood that drink making machines having physical characteristics different from those shown in the drawing and specified in the foregoing description may be made without departing from the spirit of the invention or scope of the appended claims.

Having thus described my invention, what I claim as new and desire to secure by Letters Patent is:

1. In a drink making machine of the character described, structure mounted for rectilinear reciprocation having a chamber formed therein for one of the ingredients of the drink to be made; a receptacle for another of the ingredients for the drink; dispensing mechanism for said last mentioned ingredient, said mechanism overlying said structure and being operable upon movement thereof in one direction; means operable upon movement of said structure in one direction for shifting the latter into engagement with the dispensing mechanism when the chamber is aligned with said mechanism to dispense the ingredient of said receptacle into the chamber and the one ingredient therein, said ingredients in the receptacle being liquid, said chamber having a foraminous bottom permitting passage of the liquid therethrough after contacting said one ingredient in the chamber, said bottom being hingedly mounted for movement to and from a position closing the chamber; and means for holding said bottom in said position as the structure reciprocates, said means terminating in spaced relation to one end of the path of travel of said structure whereby the bottom is free to swing by force of gravity to an open, ingredient-dumping position.

2. In a drink making machine of the character described, structure mounted for rectilinear reciprocation and having an open top chamber formed therein; a hingedly mounted, normally open, foraminous bottom for said chamber and depending from the structure; means operable upon movement of the structure in one direction for swinging said bottom to a closed position and holding the same closed as the structure reciprocates; and mechanism disposed for actuation by the structure as the latter moves in said one direction for dispensing into the chamber ingredients for a drink to be made, one of the ingredients being liquid and passing through said foraminous bottom, the other ingredient falling by force of gravity from the chamber as the structure moves in the opposite direction and said bottom swings to said normal position.

3. In a drink making machine of the character described, structure mounted for substantially horizontal, rectilinear reciprocation, and having an open top chamber formed therein; a foraminous bottom for the chamber mounted for downwardly swinging movement to and from an open position, said bottom being in said position when the structure is at one end of its path of travel; means for swinging the bottom to a closed position and holding the same closed as the structure is moved from and toward said end of its path of travel; mechanism operable upon movement of the structure in one direction for dispensing into said chamber ingredients for the drink to be made, one of the ingredients being liquid and passing through said foraminous bottom; and means for yieldably holding the structure at said one end of its path of travel whereby the same is caused to return thereto after said liquid is dispensed for dumping the other ingredient from the chamber as the bottom swings to the open position by force of gravity.

4. A drink making machine of the character described comprising a support mounted for substantially horizontal, rectilinear reciprocation; a member carried by the support for movement vertically toward and away from the support, said member having an open top chamber formed therein; a receptacle for granular ingredients for the drink to be made, disposed above the member intermediate the ends of the path of travel of said support; a liquid receptacle above the member and adjacent one of said ends of the path of travel of said support; means for each of said receptacles respectively for dispensing the ingredients thereof in measured quantities; apparatus operable upon movement of the support toward said one end of its path of travel for actuating the dispensing means for granular ingredients as the chamber moves into registering relationship therewith; and means operable upon continued movement of the support to a position bringing the chamber into register with the liquid dispensing means for moving said member away from the support into actuating engagement with the said drink dispensing means.

5. In a hot drink machine, a hot liquid reservoir having an outlet tube; a horizontally reciprocable carriage underlying said tube; a member having an ingredient chamber therein, said member being mounted between the tube and the carriage and upon the carriage for reciprocation therewith; linkage joining the carriage and the member for swingably mounting the latter for vertical movement toward and away from the carriage; and a stop within the reciprocable path of travel of the member in one direction for swinging the member away from the carriage as movement of the latter is continued in said one direction, said tube being disposed to register with said chamber as the member moves toward the uppermost end of its swinging path of travel.

6. In a hot drink machine as set forth in claim 5 wherein said reservoir is provided with a normally closed valve and said tube is vertically reciprocable and operably connected with the valve, said member being engageable with the tube as the same moves upwardly to actuate the tube and thereby open the valve.

WILLIAM S. SELZER.

REFERENCES CITED

The following references are of record in the file of this patent:

UNITED STATES PATENTS

| Number | Name | Date |
|---|---|---|
| 411,037 | Jones | Sept. 17, 1889 |
| 780,680 | Peterson et al. | Jan. 24, 1905 |
| 1,131,299 | Vandreuil | Mar. 9, 1915 |
| 1,551,855 | Svendsgaard | Sept. 1, 1925 |
| 1,755,699 | Loehr | Apr. 22, 1930 |
| 2,012,645 | Thomas | Aug. 27, 1935 |
| 2,107,274 | Anderson | Feb. 8, 1938 |
| 2,161,190 | Paull | June 6, 1939 |
| 2,243,895 | Brown | June 3, 1941 |
| 2,252,614 | Bowen | Aug. 12, 1941 |
| 2,270,327 | Mills et al. | Jan. 20, 1942 |
| 2,315,777 | Denton | Apr. 6, 1943 |
| 2,387,871 | Baumann | Oct. 30, 1945 |
| 2,484,054 | Sharp | Oct. 11, 1949 |

FOREIGN PATENTS

| Number | Country | Date |
|---|---|---|
| 18,541 | France | Feb. 16, 1914 |
| | (First addition to No. 439,740) | |
| 714,971 | France | Sept. 14, 1931 |